US005986356A

United States Patent [19]

Borsetto et al.

[11] Patent Number: 5,986,356

[45] Date of Patent: Nov. 16, 1999

[54] CONNECTION DEVICE FOR SWITCHING ELECTRICAL SIGNALS

[76] Inventors: Giancarlo Borsetto, Via Serodine 6, Bellinzona; Bruno Poletti, 6703 Osogna, both of Switzerland

[21] Appl. No.: 08/945,027

[22] PCT Filed: Apr. 25, 1996

[86] PCT No.: PCT/IB96/00378

§ 371 Date: Oct. 21, 1997

§ 102(e) Date: Oct. 21, 1997

[87] PCT Pub. No.: WO96/34432

PCT Pub. Date: Oct. 31, 1996

[30] Foreign Application Priority Data

Apr. 28, 1995 [CH] Switzerland ............................ 1221/95

[51] Int. Cl.[6] .................................................. H04L 12/02

[52] U.S. Cl. .......................... 307/112; 307/147; 200/175; 340/825.89; 370/355

[58] Field of Search .................................... 307/112, 147; 200/175; 340/825.89; 370/355, 388

[56] References Cited

U.S. PATENT DOCUMENTS 3,891,815 6/1975 Hiele ...................................... 200/175
4,345,251 8/1982 Begeman et al. .................. 340/825.89
4,993,018 2/1991 Hajikamo et al. ...................... 370/392
5,237,565 8/1993 Henrion et al. ......................... 370/355
5,361,254 11/1994 Storck et al. .......................... 370/380

*Primary Examiner*—Albert W. Paladini
*Attorney, Agent, or Firm*—Young & Thompson

[57] ABSTRACT

A connection device for switching electrical signals includes primary offtakes with multiple contacts with at least on pair of conductors carrying an incoming signal leading to each of these; a multiple incoming plug or point fitted with an equivalent number of contact terminals to the conductors carrying a signal, which are connected to the terminals; a multiple outgoing plug or point connected to the incoming multiple plug or point; the same number of outgoing conductors as there are contact terminals on the outgoing plug or point forming pairs each carrying an outgoing signal; secondary offtakes with multiple contacts with at least one pair of outgoing conductors carrying an outgoing signal leading to each of these devices for selective, revisable connection of pairs of terminals on the incoming plug or point to pairs of contacts on the primary offtakes and pairs of terminals on the outgoing plug or point with pairs of contacts on the secondary offtakes.

8 Claims, 3 Drawing Sheets

CONNECTION DEVICE FOR SWITCHING ELECTRICAL SIGNALS

BACKGROUND OF THE INVENTION

This invention concerns the field of electrotechnical applications, with particular regard to the reception and switching of electrical signals (normally low voltage) used for the transmission of data, pictures, sound, etc.

DESCRIPTION OF THE RELATED ART

These signals are currently sent to several primary offtakes with multiple contacts: although these offtakes each have at least four pairs of contacts, usually only one of these pairs is used, and from these there is only one outgoing pair (known popularly as <doublets>) of conductor wires carrying a given input signal. The pairs of wires which lead, as stated, to the primary offtakes are then connected to a multiple terminal connection element (plug or point). Offtakes are points at which an electrical signal is available to be taken off of or provide to, a particular device. In the present situation, to be taken off or provided to a connection device.

In current practice, four of these primary offtakes are used, with a total of eight conductor wires leading, as mentioned, to a connection plug or point with eight terminals.

The latter is then connected to a further of offtake or plug, respectively, with an equivalent number of terminals, from which a further eight cables lead, forming four doublets each of which is then connected to a single offtake, which can be termed the secondary offtake to distinguish it from the aforementioned primary offtakes, and this acts as an outgoing offtake to utilize the signals which reach it. Examples of this kind of connection devices are given by U.S. Pat. Nos. 4,907,253, 4,773,867 and 4,579,407.

From the description given thus far, it can be seen that to switch just four incoming signals, a total of eight offtakes with eight terminals has to be used (four for incoming signals and four for outgoing signals) connected by means of connection components with eight poles.

In addition, once one of the secondary offtakes for the outgoing signals is connected such that it; can receive a given signal received as an incoming signal by one of the said primary offtakes, this situation remains locked virtually permanently under the effects of time constraints.

Finally, in order to reduce the disadvantages of this signal switching and receiving system, modifications are, made to the connecting offtake/plug pairs, setting pairs of terminals in electrical contact which lead to different <doublets> in a predetermined mode, different from those in the original arrangement, by means of electrical <bridges> or similar devices.

In addition, both the aforementioned primary and secondary offtakes are under-used, with many of the contact terminals not connected to any signal.

SUMMARY OF THE INVENTION

To eliminate the disadvantages described above, the inventor of this invention has devised a connection device for the reception or switching of electrical signals which, as well as comprising the component parts described previously and corresponding to the state of the art, is characterized by the fact that it also includes a means of selective, reversible connection of pairs of contact terminals on the multiple outgoing offtake, or plug respectively, with the same number of pairs of terminals as the said primary offtakes to which the said pairs of conductors carrying incoming signals lead, and a means of selective, reversible connection of pairs of contact terminals on the said outgoing multiple offtake or plug, respectively, to which the outgoing conductors lead and the same number of pairs of contacts on the said secondary multiple contact offtakes for utilization of the signals.

BRIEF DESCRIPTION OF THE DRAWINGS

A description is now given of a preferred example of construction of the device as per the Invention, in which reference is also made to the attached drawings which show:

More specifically, contact terminal 1 of incoming plug C1 can be connected to contact 1 of primary offtake A1 by placing element 1 of SW1 in an on (closed) position thereby completing the circuit between contact terminal 1 of plug C1 and contact 1 of primary offtake A1. Each of elements 2 and 3 of SW1 would be placed in an off (open) position.

Figure 1:
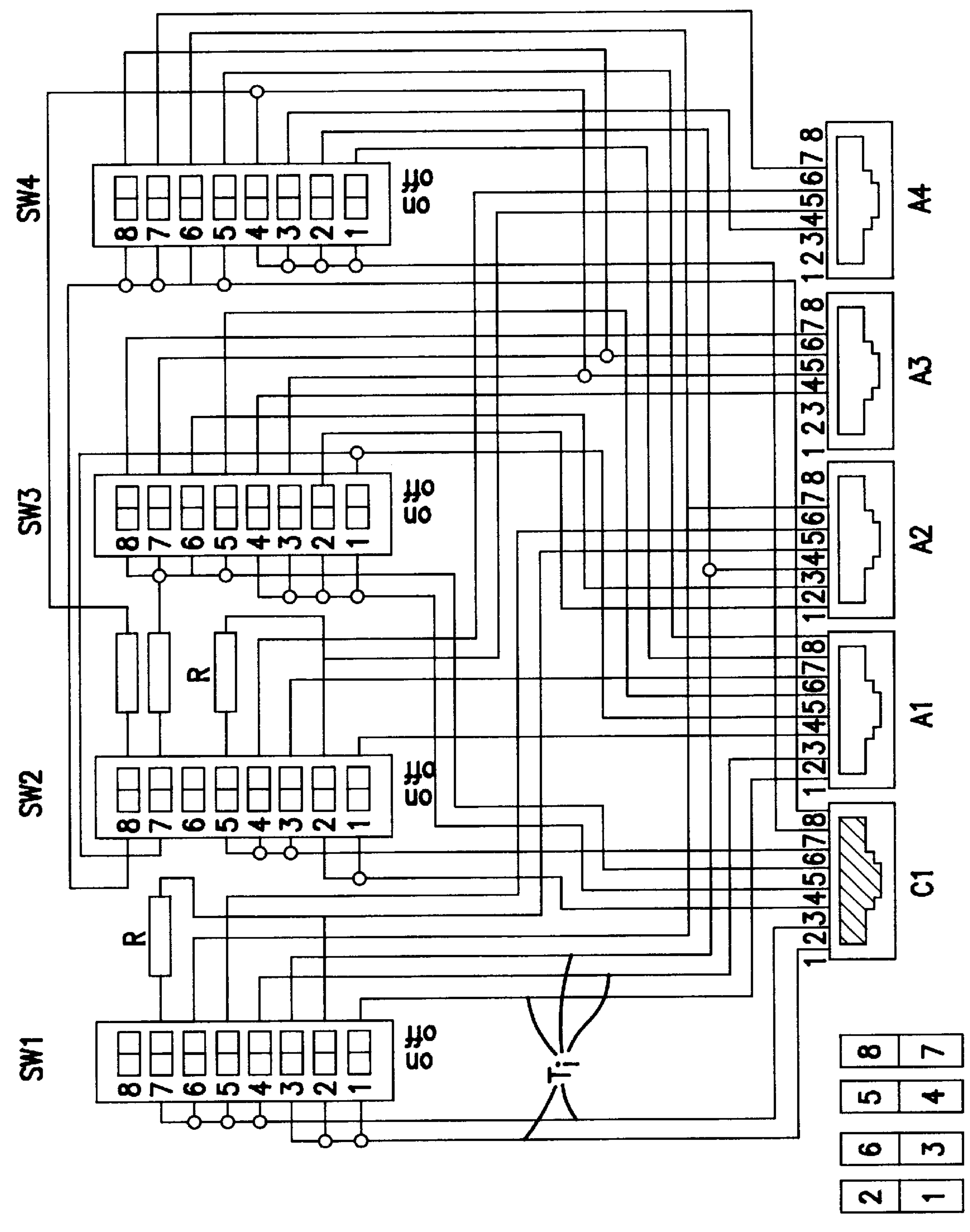

Terminal 1 of incoming plug C1 can be connected to contact 4 primary offtake A2 by placing element 2 of SW1 in the on position to complete the circuit between contact 1 of plug C1 and contact 4 of primary offtake A2. Each of elements 1 and 3 would be placed in an off position.

Terminal 1 may also be configured with contact 3 of primary offtake A2. This can be accomplished by placing element 3 of SW1 in the on position and placing elements 1 and 2 in the off position.

Thus, signals can be distributed between terminal 1 of incoming plug C1 and any of contact 1 of primary offtake A1 and contacts 3 and 4 of primary offtake A2 by placing the elements of switch 1 in the appropriate positions.

Figure 2:
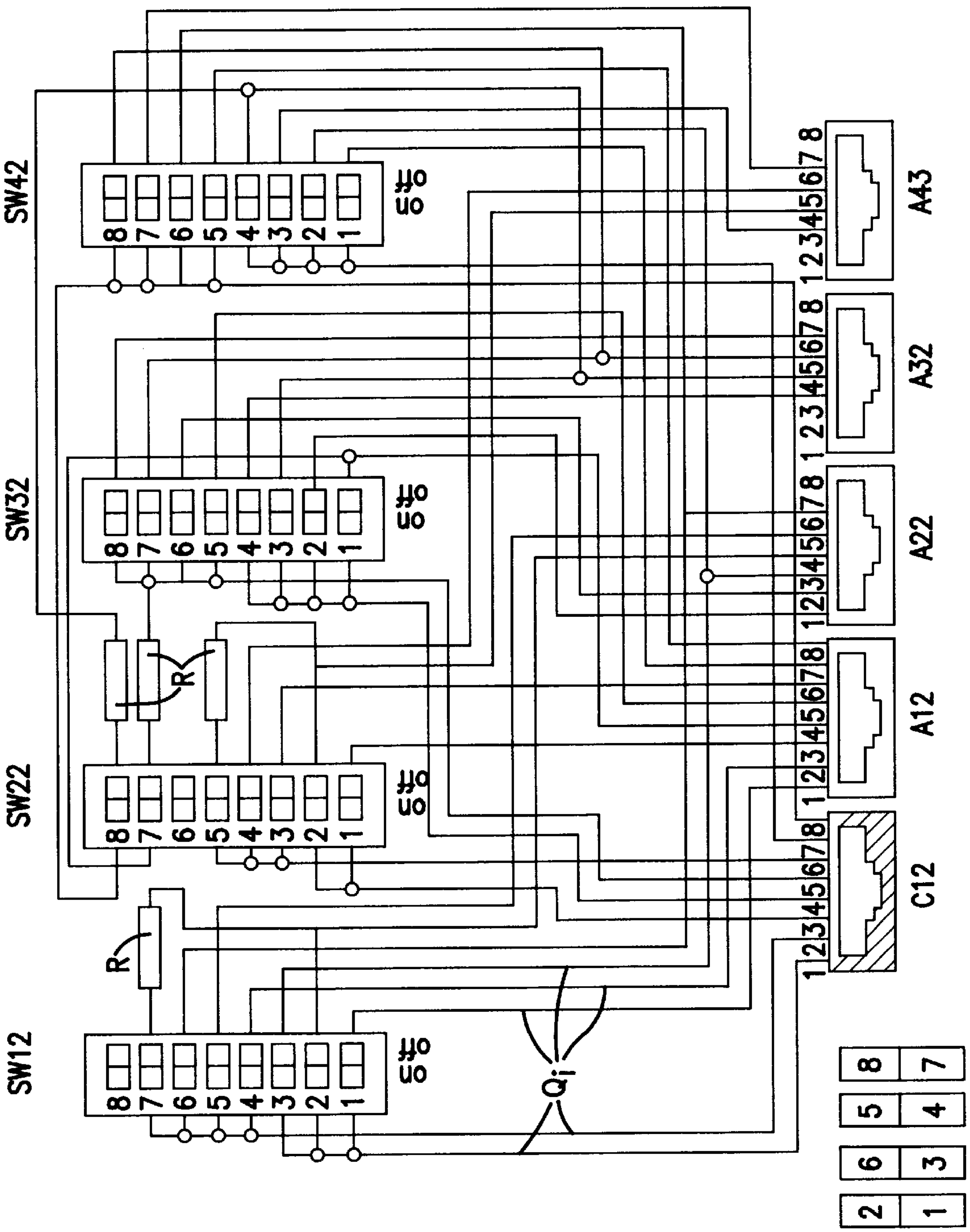
Figure 3:
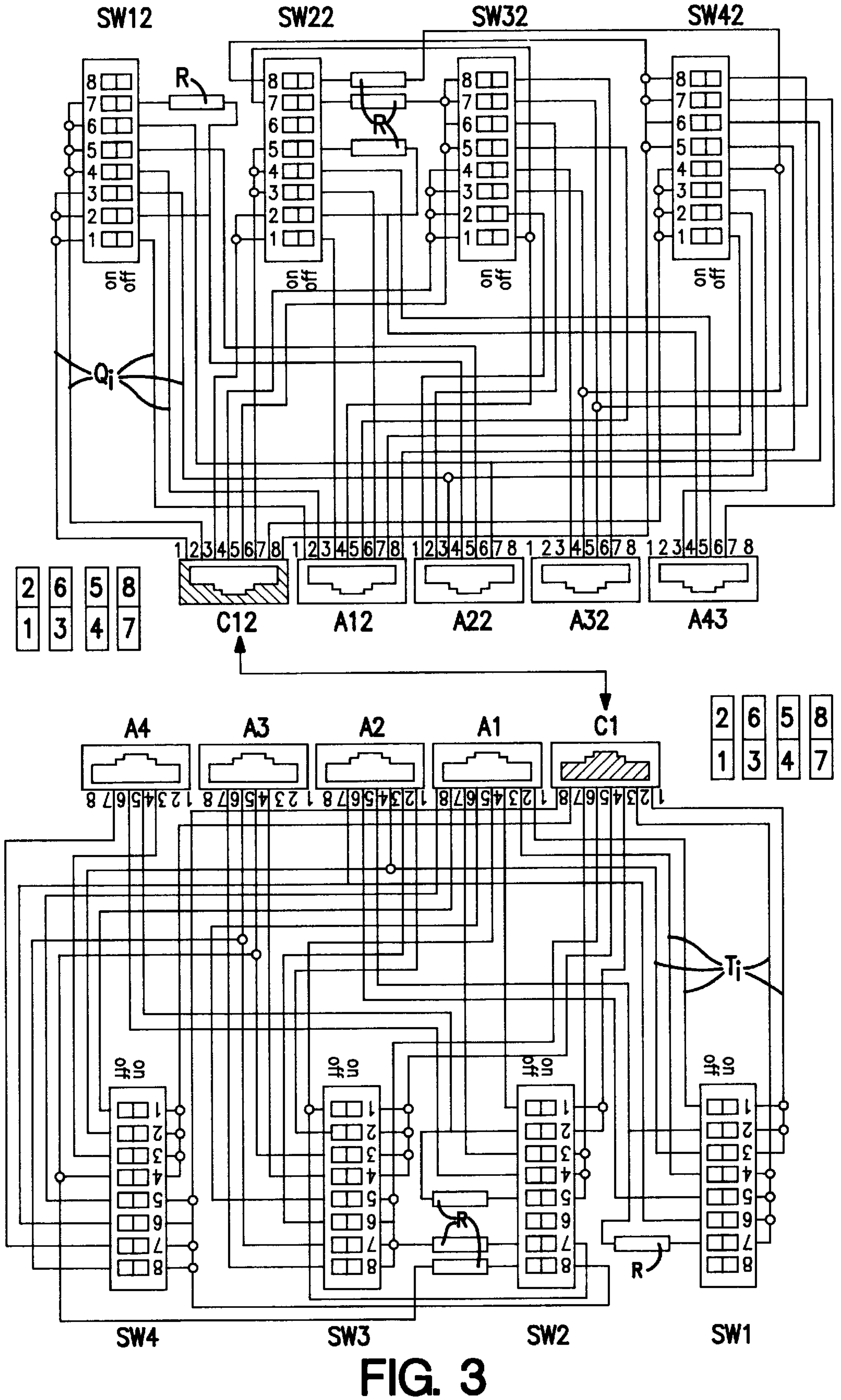

FIG. 3, the summary diagram comprising the two wiring layouts in FIG. 1 and 2 connected to each other by means of a connector element.

DESCRIPTION OF THE PREFERRED EMBODIMENTS

Looking at FIG. 1, there are four primary offtakes A1, A2, A3 and A4, with eight conductors leading to each of these (designed to form four doublets carrying an equivalent number of electrical signals) which can be connected selectively and reversibly to a connector element (plug or point) C1 by means of four sets of multiple switches SA1, SW2, SW3, SW4 with multi-function contacts, ie arranged, for example, in such a way as to connect different conductor wires depending on whether the individual elements of each switch are actuated (<On> position) or not (<Off> position).

Other types of component, such as switches and/or diverters with sliding Contacts or similar can be used for this purpose.

In the abovementioned FIG. 1, for example, the contact terminal 1 of the incoming plug C1 can be connected selectively and rensably to contact 1 of the primary offtake A1, or contact 4 of the primary offtake A2, or to contact 3 of the latter. This is achieved by actuating in different ways the various switches (8 in the figure), forming part of the switch set SW1. By reconfiguring the switches a first connection path can be made to any of the offtakes.

A similar operation can likewise be carried out for all the remaining contacts of the primary offtakes, connecting them in a predetermined manner to the terminals on plug C1 by means of the other switch sets SM2, SW3 and SW4.

In FIG. 2 again, the same operation can be applied, connecting the contact terminals of the plug C12 in a predetermined sequence and mode, to the various contacts on the secondary outgoing offtakes A12, A22, A32, A42 by selective actuation of the switches forming the switch sets SW12, SW22, SW32 and SW42.

For example, by connecting, as shown in the Figures, terminal 1 of the multiple plug C12 with contact 4 of the secondary offtake A22 (connecting switch 2 of set SW12 and disconnecting switches 1 and 3), this connects contact 4 of offtake 22, by means of the multiple plug C12 connected to plug C1 (by cable as shown in FIG. 3 so that terminal 1 of C1 and terminal 1 of C12 are in electrical communication). Thus, contact 4 of offtake A22 may be connected with contact 1 of the primary offtake A1, or with one of the contacts 3 or 4 of the primary offtake A2, depending on how the connection was configured in line with the preceding part of the explanation.

This provides a connection device for switching and receiving signals that is flexible in application, economic in cost and swift and easy to actuate, thus achieving the stated purpose of the invention.

The terminals of all the primary and secondary offtakes can also thus be fully utilized.

As already stated, the switches described thus far can be substituted with other types, for example with sliding contacts, or with diverters or change-over switches more suited to the different design requirements.

FIG. 3 shows a complete wiring diagram of the device described consisting of two parts as shown in FIG. 1 and 2, interconnected by means of the plug C1/offtake C12 pair.

Any construction that differs from the examples described so far, which are not limitative or binding, but is attributable to the concepts expressed in the attached claims, shall nonetheless be deemed to be covered by the protection granted by this application for patent.

Any construction that differs from the examples described so far, which are not limitative or binding, but is attributable to the concepts expressed in the attached claims, shall nonetheless be deemed to be covered by the protection granted by this application for patent.

The different conductors connecting the primary or secondary offtakes to the respective plugs and points can of course be joined to form sections of connecting and linking cable, or assembled in other ways.

We claim:

1. Connection device (1) for switching and receiving low voltage electrical signals, comprising:

(a) a set of primary offtakes (A1, A2, A3, A4) with multiple contacts, with at least one pair of conductors carrying an incoming signal leading to each of said primary offtakes;

(b) a multiple incoming plug or offtake (C1) fitted with contact terminals equivalent in number to the said conductors carrying the incoming signals, which are connected to the said terminals;

(c) a multiple outgoing plug or offtake (C12) designed to be connected to the said incoming multiple plug or offtake (C1) respectively and with an equivalent number of contact terminals;

(d) the same number of outgoing conductors as there are contact terminals on the said outgoing plug or offtake (C12) forming pairs each of said pairs carrying an outgoing signal, each conductor being connected to one of said contact terminals of said outgoing plug or offtake;

(e) a series of secondary offtakes with multiple contacts (A12, A22, A32, A42) for utilization of the signals, with at least one of the said pairs of outgoing conductors carrying an outgoing signal leading to each of said secondary offtakes;

a first connection means (SW1, SW2, SW3, SW4, Ti) for providing selective, revisable connection of pairs of contact terminals on the said multiple incoming plug or offtake (C1) respectively with the same number of pairs of terminals as the said primary offtakes (A1, A2, A3, A4) to which the said pairs of conductors carrying incoming signals lead; and a second connection means (SW12, SW22, SW32, SW42, Qi) for providing selective, revisable connection of pairs of contact terminals on the said offtake or multiple outgoing plug (C12) respectively, to which the said outgoing conductors lead, and to the same number of pairs of contacts as said secondary multiple-contact offtakes (A12, A22, A32, A42) for utilization of the signal by each of said secondary offtakes.

2. A device according to claim 1 wherein one of said first and second connection means comprises sets of switches with multi-function contacts and/or diverters and sections of electrical circuit which connect these electrically to the various contact terminals of the component parts of the device itself.

3. A device according to claim 1, in which all the pairs of conductors carrying an outgoing signal are joined together in one cable, termed the outgoing cable.

4. A device according to claim 3, wherein one of said first and second connectors means comprises sets of switches with multi-function contacts and/or diverters and sections of electrical circuit which connect these electrically to the various contact terminals of the component parts of the device itself.

5. A device according to claim 1 in which all the pairs of conductors carrying an incoming 6signal are joined together in a single cable, termed the incoming cable.

6. A device according to claim 5, in which all the pairs of conductors carrying an outgoing signal are joined together in one cable, termed the outgoing cable.

7. A device according to claim 5, wherein one of said first and second connection means comprises sets of switches with multi-function contacts and/or diverters and sections of electrical circuit which connect these electrically to the various contact terminals of the component parts of the device itself.

8. A connection device for simultaneously switching low voltage electrical signals, comprising:

an input plug with plural pairs of input terminals;

a set of output plugs, each of said output plugs comprising plural pairs of output terminals equal in number to that of said input plug;

a first connection means for providing selective, revisable connection of each of said plural pairs of input terminals to electrically connect with one of a corresponding pair of output terminals, said first connection means being designed and constructed so that a first of said plural pairs of input terminals may be electrically connected to a first of said output plugs while a second of said plural pairs of input terminals may simultaneously be connected to another of said output plugs;

an outgoing plug designed to be connected to said input plug and comprising plural pairs of outgoing plug terminals equal in number to that of said input plug;

conductors operatively connected between said input plug and said outgoing plug to carry signals therebetween;

a set of secondary output plugs comprising plural pairs of secondary output terminals equal in number to that of said input plug; and a second connection means for providing selective, revisable connection of each of said plural pairs of outgoing plug terminals to electrically connect with one of a corresponding pair of secondary output terminals, said second connection means being designed and constructed so that a first of said plural pairs of outgoing plug terminals may be electrically connected to a first of said secondary output plugs while a second of said plural pairs of outgoing plug terminals may simultaneously be connected to another of said secondary output plugs.

* * * * *